US012712848B2

(12) United States Patent
Kandasamy et al.

(10) Patent No.: US 12,712,848 B2
(45) Date of Patent: Aug. 18, 2026

(54) FLOW BASED BREAKOUT OF FIREWALL USAGE BASED ON TRUST

(71) Applicant: VeloCloud Networks, LLC, Santa Clara, CA (US)

(72) Inventors: Saravanan Kandasamy, Bangalore (IN); Santosh Pallagatti Kotrabasappa, Bangalore (IN); Moses Devadason, Chennai (IN); Hari Narayan Gopalan, Chennai (IN); Praveen Kumar Rajendran, Chennai (IN); Sivakumar Seenivasan, Chennai (IN); Jayaprakash Harikrishnan, Chennai (IN)

(73) Assignee: Velocloud Networks, LLC, Santa Clara, CA (US)

( * ) Notice: Subject to any disclaimer, the term of this patent is extended or adjusted under 35 U.S.C. 154(b) by 138 days.

(21) Appl. No.: 18/122,756

(22) Filed: Mar. 17, 2023

(65) Prior Publication Data

US 2024/0244036 A1 Jul. 18, 2024

(30) Foreign Application Priority Data

Jan. 13, 2023 (IN) ............................ 202341002809

(51) Int. Cl.
*H04L 9/40* (2022.01)

(52) U.S. Cl.
CPC ...... *H04L 63/0263* (2013.01); *H04L 63/0236* (2013.01)

(58) Field of Classification Search
CPC ........................ H04L 63/0236; H04L 63/0263
See application file for complete search history.

(56) References Cited

U.S. PATENT DOCUMENTS

2006/0092841 A1* 5/2006 Lloyd ................. H04L 63/1416 370/231
2016/0359877 A1* 12/2016 Kulshreshtha .......... H04L 47/20
2017/0331739 A1* 11/2017 Sharma ............... H04L 45/7453
2017/0359310 A1* 12/2017 Jameson ............. H04L 63/0236
(Continued)

OTHER PUBLICATIONS

Extended European Search Report, European Application No. 24000007.5 dated Jun. 14, 2024, 9 pages.
(Continued)

*Primary Examiner* — Daniel B Potratz
*Assistant Examiner* — Matthias Habtegeorgis
(74) *Attorney, Agent, or Firm* — Amsel IP Law PLLC; Jason Amsel

(57) ABSTRACT

A method for flow based breakout of firewall usage based on trust is provided. Some embodiments include receiving flow data for one or more flows associated with an endpoint external to a data center, the flow data indicating the one or more flows meet one or more good flow criteria, the one or more flows corresponding to flows of data communicated via a firewall and determining, based on the flow data meeting one or more trusted endpoint criteria, the endpoint is trusted. Some embodiments of the method include generating one or more policies that flows associated with the endpoint can bypass the firewall and configuring an edge services gateway with the one or more policies to cause the edge services gateway to apply the one or more policies without applying the firewall.

20 Claims, 4 Drawing Sheets

(56) References Cited

U.S. PATENT DOCUMENTS

2021/0311760 A1* 10/2021 Oki ....................... H04L 47/803
2021/0311765 A1* 10/2021 Subramanian ...... G06F 9/45558
2021/0344648 A1 11/2021 Patel et al.
2024/0056474 A1* 2/2024 Asvaren .............. H04L 63/1458

OTHER PUBLICATIONS

Krishnan et al.: "SFC Long-lived Flow Use Cases", Internet Engineering Task Force, IETF, Internet Society (ISOC), Jan. 9, 2014, pp. 1-8, XP015097916, [retrieved on Jan. 9, 2014], 8 pages.

* cited by examiner

FLOW BASED BREAKOUT OF FIREWALL USAGE BASED ON TRUST

RELATED APPLICATIONS

Benefit is claimed under 35 U.S.C. 119(a)-(d) to Foreign Application Serial No. 202341002809 filed in India entitled "FLOW BASED BREAKOUT OF FIREWALL USAGE BASED ON TRUST", on Jan. 13, 2023, by VMware, Inc., which is herein incorporated in its entirety by reference for all purposes.

BACKGROUND

A data center may include a number of endpoints, such as physical endpoints (e.g., physical machines such as physical servers, workstations, etc.) or virtualized endpoints (e.g., virtual machines, containers, or other virtual computing instances (VCIs)) that run on physical machines. The physical endpoints may be coupled to one another by an underlying physical network infrastructure. For virtualized endpoints, software defined networking (SDN) may be used to create a software defined data center (SDDC). An SDDC involves a plurality of physical machines (referred to as hosts) in communication over the physical network infrastructure of a data center (e.g., on-premise data center or a cloud data center). Each host runs one or more VCIs. These VCIs may be connected across the multiple hosts in a manner that is decoupled from the underlying physical network infrastructure. In one example, the VCIs may be connected to logical overlay networks that may span multiple hosts and that are decoupled from the underlying physical network infrastructure. The underlying physical network and the logical overlay network may use different addressing.

Whether the data center only includes physical endpoints, or includes virtualized endpoints, these endpoints may be configured to communicate with external endpoints outside of the data center via one or more edge services gateways (ESGs). In particular, an ESG is configured to operate as a gateway device that provides components, including endpoints, in a data center with connectivity to an external network, such as the Internet. An ESG may manage external public IP addresses for endpoints in the data center. An ESG also provides other networking services, such as firewalls, network address translation (NAT), dynamic host configuration protocol (DHCP), and load balancing. An ESG may be a physical gateway device, or run as a virtualized endpoint.

In an example, an internal endpoint in the data center, may communicate with an external endpoint outside of the data center via an ESG. For example, there may be an outbound flow of packets from the internal endpoint to the external endpoint, and an inbound flow of packets from the external endpoint to the internal endpoint, such that there are bi-directional flows between the internal and external endpoints. A flow is a unidirectional sequence of packets that all share a certain set of attributes which define a unique key for the flow (e.g., source IP address, destination IP address, IP protocol, source port, destination port, and protocol, which may be referred to as a 5-tuple). For example, a source IP address may be associated with a particular endpoint (referred to as a source endpoint of the flow) and the source port number may be associated with a particular application (referred to as a source application of the flow) running in the source endpoint. Further, a destination IP address may be associated with a particular endpoint (referred to as a destination endpoint of the flow) and the destination port number may be associated with a particular application (referred to as a destination application of the flow) running in the destination endpoint. A flow, therefore, may correspond to packets sent from a particular source application to a particular destination application, using a particular protocol. In some cases, other attributes may be used to define packets of a flow, such as input interface port, and type of service, such as in addition to the 5-tuple.

As communicating with endpoints outside of the data center has inherent security risks, a data center can be configured such that all flows (e.g., all outbound flows, all outbound and inbound flows, etc.) between internal endpoints and external endpoints are communicated via a firewall, such as a firewall within or outside of the data center. In some cases, some endpoints not in the same data center are considered internal endpoints as opposed to external endpoints, such as endpoints in data centers that are part of the same enterprise network. Often times, the firewall is outside the data center and run by a third party other than the owner of the data center. For example, outbound data packets from an internal endpoint to an external endpoint may be forwarded within the data center from the internal endpoint to the ESG. The ESG may then encrypt and tunnel the packets to the firewall, such as using an appropriate secure network protocol such as Internet Protocol Security (IPsec). The firewall may decrypt and inspect the data packets, such as a destination IP address, destination port, and/or application of the data packets, and forward the packets to the external endpoint if the packets pass inspection. Similarly, inbound packets from the external endpoint may be routed first to the firewall, such as based on the firewall including a source IP address associated with the firewall when forwarding packets to the external endpoint, such that the external endpoint uses a destination IP address associated with the firewall in response packets. The firewall further encrypts and tunnels the inbound packets to the ESG, which decrypts and forwards the inbound packets to the internal endpoints.

Such encryption, tunneling, decryption, and inspection of packets of a flow take significant time and processing overhead, which may lead to latency issues for traffic flow. Accordingly, techniques are needed to maintain security for communication of internal endpoints with external endpoints, while improving processing overhead and latency.

It should be noted that the information included in the Background section herein is simply meant to provide a reference for the discussion of certain embodiments in the Detailed Description. None of the information included in this Background should be considered as an admission of prior art.

SUMMARY

A method for flow based breakout of firewall usage based on trust is provided. Some embodiments include receiving flow data for one or more flows associated with an endpoint external to a data center, the flow data indicating the one or more flows meet one or more good flow criteria, the one or more flows corresponding to flows of data communicated via a firewall and determining, based on the flow data meeting one or more trusted endpoint criteria, the endpoint is trusted. Some embodiments of the method include generating one or more policies that flows associated with the endpoint can bypass the firewall and configuring an edge services gateway with the one or more policies to cause the edge services gateway to apply the one or more policies without applying the firewall.

Another embodiment includes a system for breakout of firewall usage based on trust. Embodiments of the system include at least one processor and at least one memory, the at least one processor and the at least one memory configured to cause the system to receive flow data for one or more flows associated with an endpoint external to a data center, the flow data indicating the one or more flows meet one or more good flow criteria, the one or more flows corresponding to flows of data communicated via a firewall and determine, based on the flow data meeting one or more trusted endpoint criteria, the endpoint is trusted. Some embodiments of the system generate one or more policies that flows associated with the endpoint can bypass the firewall and configure an edge services gateway with the one or more policies to cause the edge services gateway to apply the one or more policies without applying the firewall.

Another embodiment includes a non-transitory computer-readable medium for breakout of firewall usage based on trust. Embodiments of the non-transitory computer-readable medium include instructions that, when executed by at least one processor of a computing system, cause the computing system to receive flow data for one or more flows associated with an endpoint external to a data center, the flow data indicating the one or more flows meet one or more good flow criteria, the one or more flows corresponding to flows of data communicated via a firewall and determine, based on the flow data meeting one or more trusted endpoint criteria, the endpoint is trusted. In some embodiments, the instructions cause the computing system to generate one or more policies that flows associated with the endpoint can bypass the firewall and configuring an edge services gateway with the one or more policies to cause the edge services gateway to apply the one or more policies without applying the firewall.

These and additional features provided by the embodiments of the present disclosure will be more fully understood in view of the following detailed description, in conjunction with the drawings.

DETAILED DESCRIPTION

Figure 1:
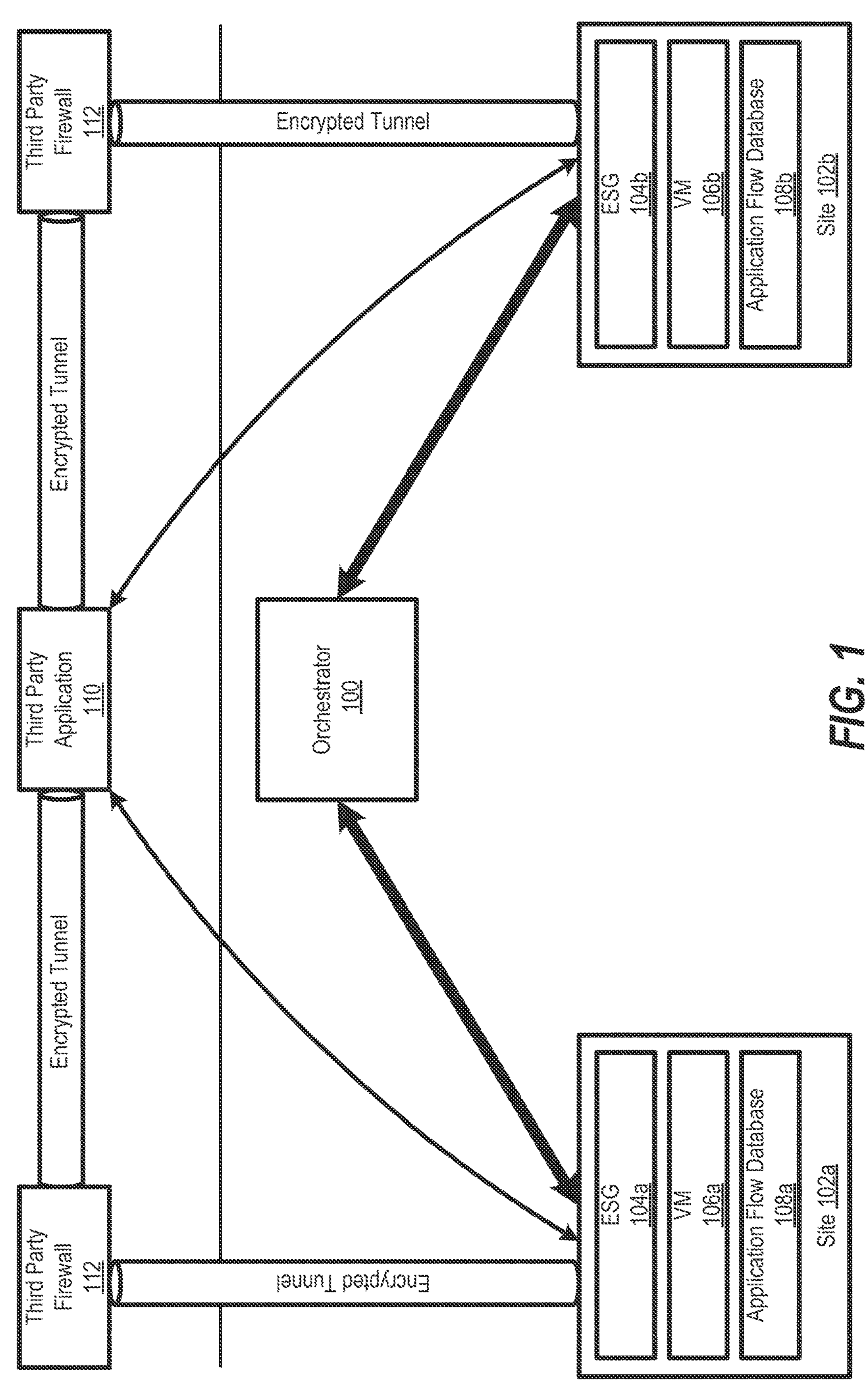
FIG. 1 depicts a network environment in which embodiments of the present application may be implemented.

The present disclosure provides techniques for allowing an ESG to breakout trusted flows with external endpoints, such that trusted flows can bypass the use of a firewall. In an example, the firewall is a third party next generation firewall, which is firewall that combines a traditional firewall with other network device filtering functions such as in-line deep packet inspection. Accordingly, such trusted flows bypassing the firewall avoid additional encryption, decryption, tunneling, and inspection, which can improve the latency and processing overhead of such flows. For example, such trusted flows may occur between internal endpoints and external endpoints via an ESG, but without going through the firewall, thereby reducing latency. Further, should the firewall become inoperable or otherwise inaccessible, such trusted flows between internal endpoints and external endpoints can continue without interruption.

In certain aspects, the ESG is configured to identify outbound flows for the firewall. For example, the ESG may receive a packet from an internal endpoint to an external endpoint, the packet corresponding to an outbound flow. The ESG may determine that the destination associated with the outbound flow (e.g., as indicated by the destination IP address, destination port, and/or application indicated in the header of the packet) is not yet known to be trusted. Accordingly, the ESG may further monitor the outbound flow (and optionally the corresponding inbound flow of a bi-directional flow, as discussed) and determine whether the outbound flow (and in turn its corresponding inbound flow) is good based on one or more criteria as part of determining whether the destination associated with the outbound flow should be trusted. The one or more criteria are referred to as good flow criteria, where a flow is considered good if each of the one or more good flow criteria are met.

For example, as one good flow criteria, the ESG may monitor, such as for a certain (e.g., configurable) time period, the outbound flow (and optionally the corresponding inbound flow) to determine whether there are any retransmits or resets. If there are resets or retransmits, the ESG may determine the outbound/inbound flow is not good, which may be used in part to determine the destination is not to be trusted. If there are no resets or retransmits, the ESG may determine the outbound/inbound flow is good (such as based on this good flow criteria alone, or based on other good flow criteria being met), which may be used in part to determine the destination is to be trusted. Additionally or alternatively, as another good flow criteria, the ESG may determine whether the outbound flow (and optionally the corresponding inbound flow) is gracefully terminated, such as via a TCP FIN packet, a TCP FINACK packet, an ACK packet, and/or the like, or whether the termination was unexpected. If the termination is not graceful, the ESG may determine the outbound/inbound flow is not good, which may be used in part to determine the destination is not to be trusted. If the termination is graceful, the ESG may determine the outbound/inbound flow is good (such as based on this criteria alone, or based on other criteria being met), which may be used in part to determine the destination is be trusted.

In certain aspects, the determination of whether the flow associated with a destination is good is used to determine whether the destination is to be trusted. In certain aspects, one or more criteria are used to determine whether the destination is to be trusted. If the one or more criteria are met, the endpoint, as in the destination, is a trusted endpoint. The one or more criteria are referred to as one or more trusted endpoint criteria. As an example, one trusted endpoint criteria is a threshold number of flows associated with a destination are determined good (and optionally no flows associated with the destination are determined to not be good). In certain aspects, the threshold number is to be met within a moving time window. The threshold number may be user configurable. As another example, one trusted endpoint criteria is there have been no flows associated with the destination determined to not be good during a threshold time period. In certain aspects, the threshold time period is user configurable.

If the one or more trusted endpoint criteria are met, the destination is determined to be trusted. If the one or more trusted endpoint criteria are not met, the destination is determined not to be trusted. If the destination is not to be trusted, the ESG continues to send all outbound flows to the destination (e.g., all outbound flows with the corresponding destination IP address, destination port, and/or application indicated in the headers of the packets) via the firewall. Accordingly, corresponding inbound flows may also occur via the firewall as discussed. In certain aspects, if the destination is to be trusted, the ESG begins sending all outbound flows to the destination (e.g., all outbound flows with the corresponding destination IP address, destination port, and/or application indicated in the headers of the packets) directly and bypasses the firewall. Accordingly, corresponding inbound flows may also bypass the firewall in response, as discussed.

In certain aspects, the ESG may make the determination of whether to trust a destination endpoint locally, such as based on flow monitoring occurring at the ESG and/or information of additional flows received from other ESGs. In certain aspects, each ESG is configured to send the information about good flows to an orchestrator, and the orchestrator determines whether a destination is to be trusted. The orchestrator then disseminates information (e.g., policies, such as local policies, forwarding rules, and/or the like) about each trusted destination to each ESG, to allow all the ESGs to bypass the firewall for outbound flows associated with the trusted destination. Local policies may, for example, define allowed sources of packets, define allowed destinations of packets, define allowed protocols of the traffic, and/or allowable destination ports, etc., which may bypass the firewall. Local policies may be expressed as one or more forwarding rules at the ESG, whereby the one or more rules cause traffic indicated in the policy as trusted to bypass the firewall, and optionally other policies may be applied as well. The translations of “policies” defined at the orchestrator that are associated with trusted destinations having a set of characteristics to “rules” associated with a set of IP addresses and/or other packet header information can happen at the orchestrator, at the ESG, and/or by another component such as a firewall agent. For the purposes of this document, the term “policies” encompass the forgoing types of policies/rules.

In certain aspects, trust of a destination can age out, such as after a certain time period after determining the destination is trusted. Accordingly, after the time period, the ESG and/or orchestrator may be configured to again start communicating outbound flows via the firewall for the destination, and start the process again.

Certain aspects of the techniques discussed herein are discussed with respect to virtualized endpoints, but it should be noted that the techniques are similarly applicable to physical endpoints. Further, certain aspects are discussed herein with respect to an enterprise-specific wide area network (WAN) spanning multiple data centers with one or more orchestrators managing one or more data centers each. Such dissemination and collection of information across multiple data centers by the orchestrator may increase efficiency while maintaining security across a greater number of endpoints and data centers. However, it should be understood that the techniques are similarly applicable to other data center configurations, and without implication an orchestrator, as discussed. Certain aspects of the techniques are discussed with respect to a third party firewall and a third party application as a destination, however, the techniques may similarly be applicable to any suitable firewall or destination.

In an example, many current enterprises create an enterprise-specific wide area network (WAN) across multiple data centers to communicatively couple virtualized endpoints (also referred to as workloads) across the enterprise. The enterprise-specific WAN may be configured as a software defined (SD) WAN and may utilize an orchestrator for creating and managing the SD-WAN. Some SD-WANs may utilize one or more orchestrators, which may be configured to provide monitoring functionality to observe various performance and operational characteristics of workloads and ESGs in the SD-WAN. The orchestrator may be configured as the control plane used to create policy management and may provide visibility into network operation. The orchestrator provides centralized enterprise-wide installation, configuration, and real-time monitoring in addition to orchestrating the data flow through the cloud network.

The ESGs devices may be coupled to the orchestrator via an appropriate communication link. In certain aspects, the communication link supports dynamic multipath optimization (DMPO). DMPO provides automatic link monitoring and per packet traffic steering, auto-detection of provider and auto-configuration of link characteristics, routing and QOS settings. DMPO remediates link degradation through forward error correction, activating jitter buffering and synthetic packet production and provides sub-second steering without session drops. DMPO aggregates bandwidth for single flows and uses multiple transports and picks the best one. It protects against concurrent degradation and enables single link performance.

Referring now to the drawings, FIG. 1 depicts a network environment in which embodiments of the present application may be implemented. As illustrated, an enterprise WAN may be created and managed by an orchestrator 100. The orchestrator 100 may be configured to provide an enterprise WAN (such as an SD WAN) and communicatively connect one or more sites 102*a*, 102*b* (collectively “sites 102”), which may be different data centers. Each of the sites 102 may include one or more ESGs, such as ESG 104*a*, 104*b*, one or more workloads, such as virtual machine (VM) 106*a*, 106*b*, as well as an application flow database 108*a*, 108*b*.

As discussed, an internal endpoint, such as VM 106*a* in site 102*a* may start an outbound flow with a destination, such as third party application 110. Accordingly, the packets of the outbound flow are forwarded to ESG 104*a*. ESG 104*a*, based on not yet trusting third party application 110, encrypts and tunnels the packets to third party firewall 112, such as using IPsec. Third party firewall 112 decrypts the packets and may either drop the packets if they do not pass firewall rules, or may further encrypt and tunnel the packets to third party application 110, such as using IPsec. As discussed, such communication via the third party firewall 112 causes overhead and latency.

Figure 2:
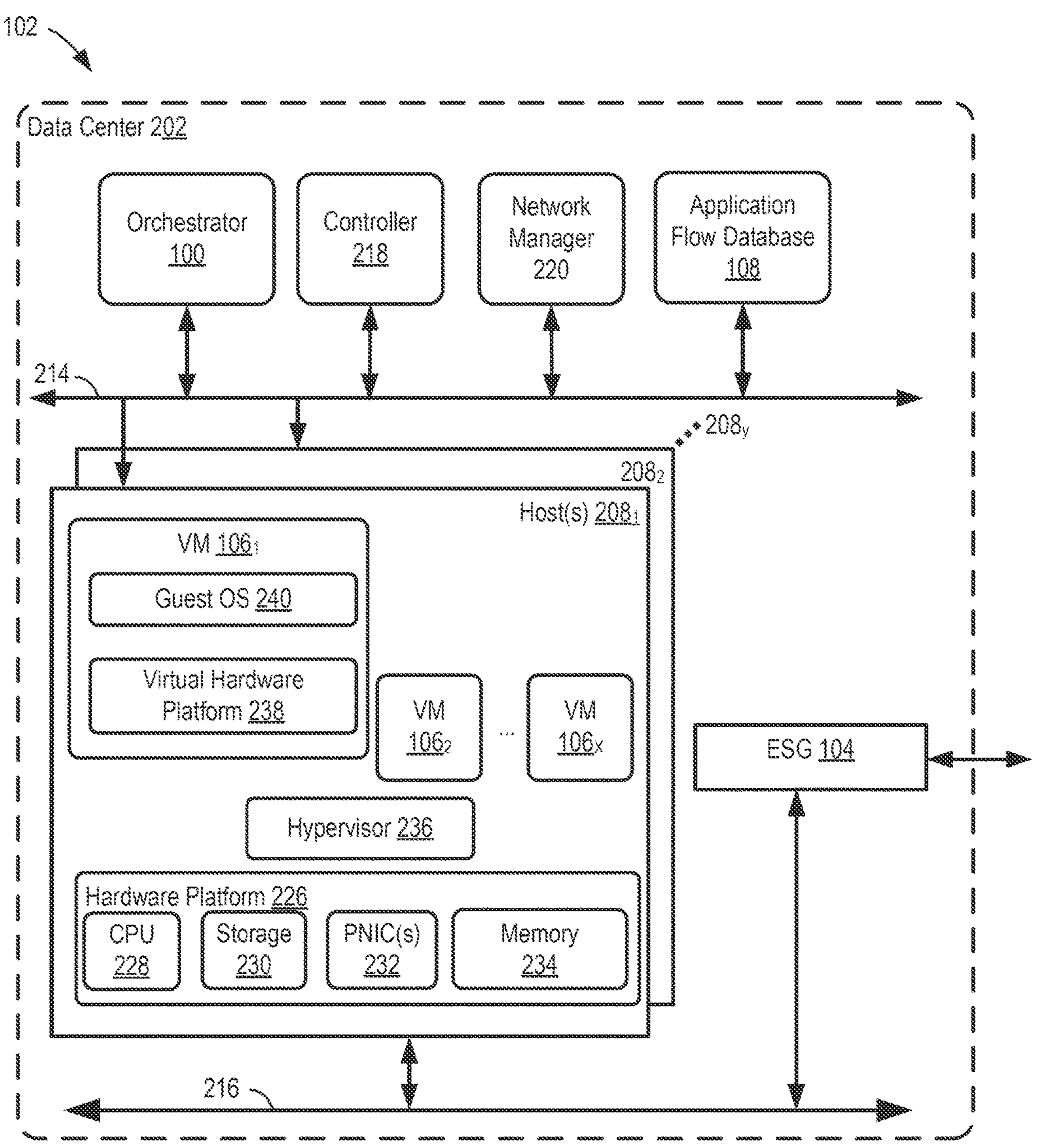
FIG. 2 depicts example physical and virtual network components in a networking environment in which embodiments of the present application may be implemented, according to an example embodiment of the present application.

FIG. 2 depicts example physical and virtual network components in the enterprise network from FIG. 1, in which embodiments of the present application may be implemented. FIG. 2 illustrates site 102, which may include a data center 202 with one or more physical computing devices, e.g., running one or more virtual machines (VMs) 106. Depending on the particular embodiment, data center 202 may be configured as a cloud data center or an on-premises data center.

Data center 202 includes one or more hosts 208 (e.g., $\mathbf{208}_1$, $\mathbf{208}_2$, . . . , $\mathbf{208}_y$), edge services gateway (ESG) 104, a management network 214, a data network 216, a controller 218, a network manager 220, and orchestrator 100. Though one ESG 104 is shown, data center 202 may include multiple ESGs. Further, though orchestrator 100 is shown as within data center 202 and coupled to management network 214, orchestrator 100 may be outside of data center 202 and communicate with ESG 104 over an external network. Management network 214 and data network 216 may be implemented as separate physical networks or as separate virtual local area networks (VLANs) on the same physical network.

Host(s) 208 may be communicatively connected to both management network 214 and data network 216. Management network 214 and data network 216 are also referred to as physical or "underlay" networks, and may be separate physical networks or the same physical network. As used herein, the term "underlay" may be synonymous with "physical" and refers to physical components of the data center 202. As used herein, the term "overlay" may be used synonymously with "logical" and refers to the logical network implemented at least partially within data center 202.

Each of hosts 208 may be constructed on a hardware platform 226, which may be server grade, such as an x86 architecture platform. Hosts $208_1$, . . . $208_y$ (collectively or individually referred to as host(s) 208) may be geographically co-located servers on the same rack or on different racks. In some embodiments, one or more of the hosts 208 may be located remote from data center 202 and/or as part of a different data center and coupled to the enterprise network.

Hardware platform 226 of a host 208 may include components of a computing device such as at least one processor (CPUs) 228, storage 230, one or more network interfaces (e.g., physical network interface cards (PNICs) 232), system memory 234, and other components (not shown). CPU 228 is configured to execute instructions, for example, executable instructions that perform one or more operations described herein and that may be stored in the memory and storage system. The network interface(s) enable host 208 to communicate with other devices via a physical network, such as management network 214 and data network 216.

Each host 208 may be configured to provide a virtualization layer, also referred to as a hypervisor 236. The hypervisor 236 abstracts processor, memory, storage, and networking physical resources of hardware platform 226 into a number of virtual machines (VMs) $106_1$ . . . $106_x$ (collectively or individually referred to as VM(s) 106) on hosts 208. As shown, multiple VMs 106 may run concurrently on the same host 208.

A virtual machine 106 implements a virtual hardware platform 238 that supports the installation of a guest OS 240 which is capable of executing one or more applications. Guest OS 240 may be a standard, commodity operating system. Examples of a guest OS 240 include Microsoft Windows, Linux, and the like.

The hypervisor 236 may run in conjunction with an operating system (OS) in its respective host 208. In some embodiments, hypervisors can be installed as system level software directly on hardware platforms of its respective host 208 (e.g., referred to as "bare metal" installation) and be conceptually interposed between the physical hardware and the guest OSs executing in the VMs 106. Though certain aspects are described herein with respect to VMs 106 running on hosts 208, it should be understood that such aspects are similarly applicable to physical machines, like hosts 208, without the use of virtualization.

ESG 104 is configured to operate as an edge device that provides components in data center 202 with connectivity to an external network. ESG 104 may manage external public IP addresses for VMs 106. ESG 104 may include a router (e.g., a virtual router and/or a virtual switch) that routes traffic incoming to and outgoing from data center 202. ESG 104 also provides other networking services, such as firewalls, network address translation (NAT), dynamic host configuration protocol (DHCP), and load balancing.

While ESG 104 is illustrated in FIG. 2 as a component outside of host 208, in some embodiments, ESG 104 may be situated on host 208 and provide networking services, such as firewalls, NAT, DHCP, and load balancing services as a VM.

Data center 202 also includes a management plane and a control plane. The management plane and control plane each may be implemented as single entities (e.g., applications running on a physical or virtual compute instance), or as distributed or clustered applications or components. In some embodiments, a combined manager/controller application, server cluster, or distributed application, may implement both management and control functions. In some embodiments, network manager 220 at least in part implements the management plane and controller 218 at least in part implements the control plane.

The control plane determines the logical overlay network topology and maintains information about network entities such as logical switches, logical routers, and endpoints, etc. The logical topology information is translated by the control plane into network configuration data that is then communicated to network elements of host(s) 208. Controller 218 generally represents a control plane that manages configuration of VMs 106 within data center 202. Controller 218 may be one of a plurality of controllers executing on various hosts 208 in the site 102 that together implement the functions of the control plane in a distributed manner. Controller 218 may be a computer program that resides and executes at the data center 202 or, in some aspects, controller 218 may run as a virtual appliance (e.g., a VM 106) in one of hosts 208. Although shown as a single unit, it should be understood that controller 218 may be implemented as a distributed or clustered system. That is, controller 218 may include multiple servers or virtual computing instances that implement controller functions. It is also possible for controller 218 and network manager 220 to be combined into a single controller/manager. Controller 218 collects and distributes information about the network from and to endpoints in the network. Controller 218 is associated with one or more virtual and/or physical CPUs. Processor(s) resources allotted or assigned to controller 218 may be unique to controller 218, or may be shared with other components of the data center 202. Controller 218 communicates with hosts 208 via management network 214, such as through control plane protocols. In some embodiments, controller 218 implements a central control plane (CCP).

Network manager 220 and orchestrator 100 generally represent components of a management plane that include one or more computing devices responsible for receiving logical network configuration inputs, such as from a user or network administrator, defining one or more endpoints and the connections between the endpoints, as well as policies and/or rules governing communications between various endpoints.

In some embodiments, orchestrator 100 is a computer program that executes in a server (e.g., the same or a different server than the server on which network manager 120 executes), or in some aspects, orchestrator 100 runs in one or more VM 106. In some embodiments, orchestrator 100 is configured to carry out administrative tasks for data center 202, including managing hosts 208, managing VMs 106 running within each host 208, provisioning VMs 106, transferring VMs 106 from one host 208 to another host 208, transferring VMs 106 between data centers 202, transferring application instances between VMs 106 or between hosts 208, and load balancing among hosts 208 within data center 202. In some embodiments, orchestrator 100 takes commands as to creation, migration, and deletion decisions of VMs 106 and application instances on the data center 202. In some embodiments, however, orchestrator 100 also makes independent decisions on management of local VMs 106 and application instances, such as placement of VMs 106 and application instances between hosts 208. In some embodiments, orchestrator 100 also includes a migration component that performs migration of VMs 106 between hosts 208, such as by live migration.

In some embodiments, network manager 220 is a computer program that executes in a central server in networking data center 202, or in some embodiments, network manager 220 may run in a VM 106, e.g., in one of hosts 208. Network manager 220 communicates with host(s) 208 via management network 214. Network manager 220 may receive network configuration input from a user or an administrator and generate desired state data that specifies how a logical network should be implemented in the physical infrastructure of the data center 202.

Network manager 220 is configured to receive inputs from an administrator or other entity, e.g., via a web interface or application programming interface (API), and carry out administrative tasks for the data center 202, including centralized network management and providing an aggregated system view for a user.

In certain aspects, these inputs may include, for example, one or more criteria for determining whether a flow is good, as discussed. In certain aspects, these inputs may include, for example, one or more criteria for determining whether a destination is to be trusted, such as based on whether flows associated with the destination are determined to be good, as discussed.

Figure 3:
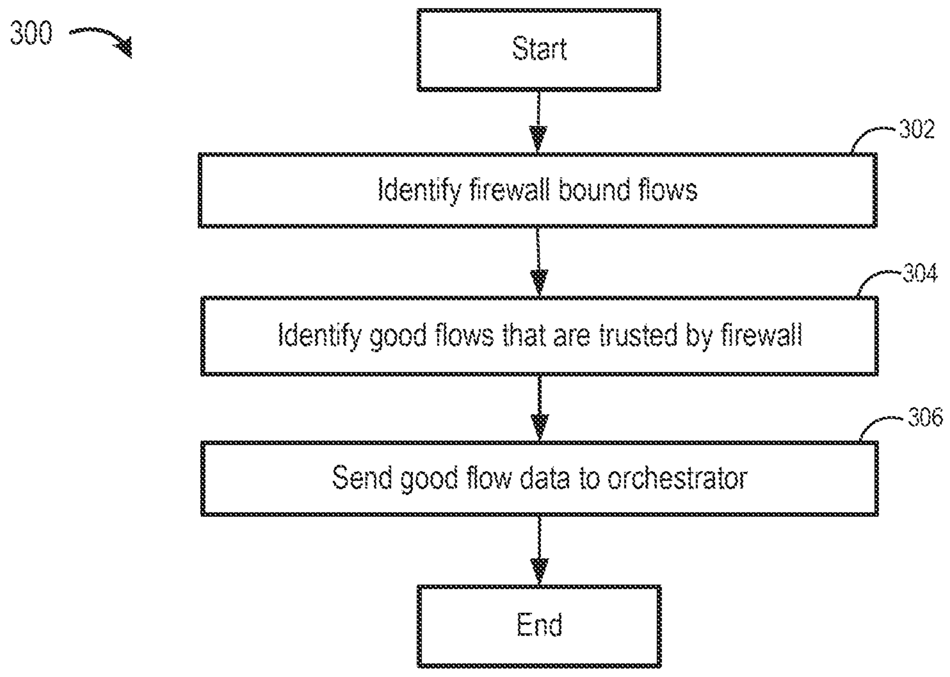
FIG. 3 depicts a flowchart of a process for identifying good flows, according to an example embodiment of the present application.

FIG. 3 depicts a flowchart of a process 300 for identifying good flows, according to an example embodiment of the present application. Process 300 may be performed, for example, by an ESG, such as ESG 104. As illustrated in block 302, an ESG 104 may identify firewall bound flows. Specifically, the ESG 104 may identify those flows from a VM 106 to an external endpoint outside of enterprise WAN, such as based on the destination IP address, destination port, and/or application indicated in the headers of packets of the flow not being associated with any internal endpoint. In block 304, the ESG 104 may identify which of the firewall bound flows are good flows based on one or more criteria. Good flows may include flows that do not have retransmits, and/or flows that are not reset from either end, as discussed. Additionally or alternatively, good flows may include those flows that are gracefully terminated, such as a termination packet is sent, acknowledged, and termination is acknowledged. Optionally, at block 306, where the destination trust is determined by orchestrator 100, once the good flow data is determined, the ESG 104 may send the good flow data to the orchestrator 100 for further processing, as described with reference to FIG. 4.

Figure 4:
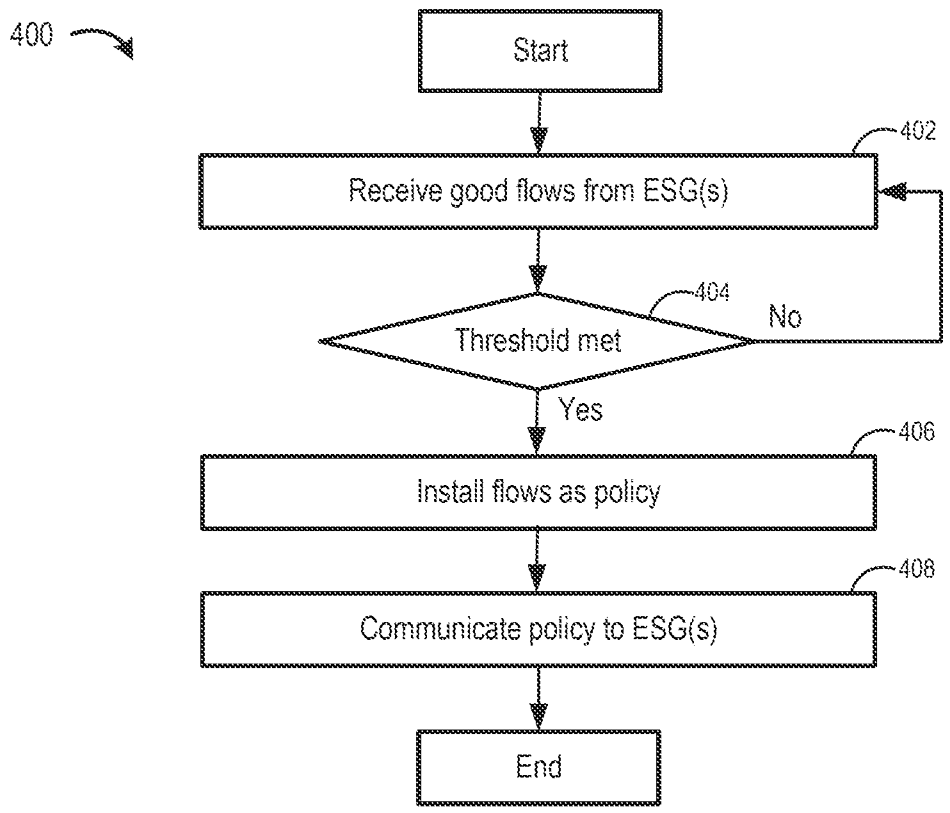
FIG. 4, depicts a flowchart of a process for converting good flow data into a policy for bypassing a third party firewall, according to an example embodiment of the present application.

FIG. 4, depicts a flowchart of a process 400 for converting good flow data into a policy (e.g., local policy) for bypassing a third party firewall, according to an example embodiment of the present application. In certain aspects, process 400 is performed by an orchestrator, such as orchestrator 100. In certain aspects, process 400 is performed by an ESG, such as ESG 104. In certain aspects, where process 400 is performed by an ESG, processor 400 may or may not include blocks 402 and 408. As illustrated in block 402, good flow data is received from one or more ESGs 104. At block 404, it is determined if one or more criteria are met for trusting a destination based on the good flow data. As an example described above, one criteria may be the number of successful connections between any VM 106 in the enterprise WAN and the destination. If the number of actual successful connections exceeds a threshold number, the destination may be determined safe. Other criteria may be used, as already discussed herein. If the destination is determined safe, at block 406 one or more policies may be generated for ESGs to send outbound flows to the destination directly and bypass a firewall.

In block 408, the one or more policies are sent to ESGs 104 in the enterprise WAN. Accordingly, ESGs 104 are configured with the one or more policies. Thus, when a VM 106 attempts to communicate with that particular destination, that connection need not be made via an encrypted tunnel to the third party firewall 112. For example, the ESGs 104 may apply the policy (e.g., as one or more rules) to bypass the third party firewall 112, meaning not apply the third party firewall 112 to the traffic to the particular destination.

It should be noted that while the embodiment of process 400 illustrates one threshold for making a policy, this is merely an example. Some embodiments may utilize one or more thresholds that may need to be met for creating a policy. Similarly, embodiments provided herein may break or discontinue a policy based on administrator inputs, and/or changes in the connection that would indicate that the connection might not be trusted any longer, such as after a time period where trust then again needs to be re-established.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), NVMe storage, Persistent Memory storage, a CD (Compact Discs), CD-ROM, a CD-R, or a CD-RW, a DVD (Digital Versatile Disc), a magnetic tape, and other optical and non-optical data storage devices. The computer readable medium can be a non-transitory computer readable medium. The computer readable medium can also be distributed over a network coupled computer system so that the computer readable code is stored and executed in a distributed fashion. In particular, one or more embodiments may be implemented as a non-transitory computer readable medium comprising instructions that, when executed by at least one processor of a computing system, cause the computing system to perform a method, as described herein.

Although one or more embodiments of the present application have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers. Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of one or more embodiments. In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s). In the claims, elements and/or steps do not imply any particular order of operation, unless explicitly stated in the claims.

What is claimed is:

1. A method for flow based breakout of firewall usage based on trust, the method comprising:

receiving, at an edge services gateway, flow data for one or more flows communicated via a firewall external to a data center between one or more internal endpoints internal to the data center and an external endpoint that is external to the data center, wherein each of the one or more flows comprises respective sequences of packets that share a certain set of attributes;

detecting that the flow data indicates that the one or more flows meet one or more good flow criteria, wherein the one or more good flow criteria comprise one or more of:

no resets or retransmits occurring for the one or more flows; or a termination packet being sent to terminate the one or more flows;

determining, based on the flow data meeting one or more trusted endpoint criteria, the external endpoint is trusted, wherein the one or more trusted endpoint criteria comprises one or more of:

a threshold number of the one or more flows to the external endpoint meeting the one or more good flow criteria within a moving time window; or the one or more flows to the external endpoint lacking any flow that fails to meet the one or more good flow criteria for a threshold duration;

generating one or more policies that flows associated with the external endpoint can bypass the firewall; and configuring the edge services gateway with the one or more policies to cause the edge services gateway to facilitate subsequent flows with the external endpoint while bypassing the firewall.

2. The method of claim 1, wherein receiving the flow data comprises receiving one or more portions of the flow data from a plurality of edge services gateways, and further comprising configuring the plurality of edge services gateways with one or more rules.

3. The method of claim 1, wherein the data center is a software-defined data center (SDDC) comprising a plurality of hosts, each of the plurality of hosts comprising a virtualization layer that abstracts physical resources for one or more virtual computing instances (VCI) supported by the virtualization layer.

4. The method of claim 1, wherein the one or more trusted endpoint criteria further comprises: the one or more flows meeting the one or more good flow criteria having lasted for a threshold duration.

5. The method of claim 1, further comprising identifying each of the one or more flows is associated with the external endpoint based on packets of the one or more flows including in a header a destination IP address, destination port, and application associated with the endpoint.

6. The method of claim 1, further comprising communicating with the external endpoint without the firewall.

7. The method of claim 1, further comprising expiring the one or more policies at the edge services gateway after a time period to cause the edge services gateway to communicate with the external endpoint via the firewall.

8. A system for flow based breakout of firewall usage based on trust, comprising:

at least one processor; and at least one memory, the at least one processor and the at least one memory configured to cause the system to:

receive, at an edge services gateway, flow data for one or more flows communicated via a firewall to a data center between one or more internal endpoints internal to the data center and an external endpoint that is external to a data center, wherein each of the one or more flows comprises respective sequences of packets that share a certain set of attributes;

detect that the flow data indicates that the one or more flows meet one or more good flow criteria, wherein the one or more good flow criteria comprise one or more of:

no resets or retransmits occurring for the one or more flows; or a termination packet being sent to terminate the one or more flows;

determine, based on the flow data meeting one or more trusted endpoint criteria, the external endpoint is trusted, wherein the one or more trusted endpoint criteria comprises one or more of:

a threshold number of the one or more flows to the external endpoint meeting the one or more good flow criteria within a moving time window; or the one or more flows to the external endpoint lacking any flow that fails to meet the one or more good flow criteria for a threshold duration;

generate one or more policies that flows associated with the external endpoint can bypass the firewall; and configure the edge services gateway with the one or more policies to cause the edge services gateway to facilitate subsequent flows with the external endpoint while bypassing the firewall.

9. The system of claim 8, wherein receiving the flow data comprises receiving one or more portions of the flow data from a plurality of edge services gateways, and further comprising configuring the plurality of edge services gateways with one or more rules.

10. The system of claim 8, wherein the data center is a software-defined data center (SDDC) comprising a plurality of hosts, each of the plurality of hosts comprising a virtualization layer that abstracts physical resources for one or more virtual computing instances (VCI) supported by the virtualization layer.

11. The system of claim 8, wherein the one or more trusted endpoint criteria further comprises:

the one or more flows meeting the one or more good flow criteria having lasted for a threshold duration.

12. The system of claim 8, wherein the at least one memory and at the least one processor are further configured to cause the system to identify that each of the one or more flows is associated with the external endpoint based on packets of the one or more flows including in a header a destination IP address, destination port, and application associated with the endpoint.

13. The system of claim 8, wherein the at least one memory and at the least one processor are further configured to cause the system to communicate with the external endpoint without the firewall.

14. The system of claim 8, wherein the at least one memory and at the least one processor are further configured to cause the system to expire the one or more policies at the edge services gateway after a time period to cause the edge services gateway to communicate with the external endpoint via the firewall.

15. A non-transitory computer-readable medium for flow based breakout of firewall usage based on trust comprising instructions that, when executed by at least one processor of a computing system, cause the computing system to perform operations comprising:

receiving, at an edge services gateway, flow data for one or more flows communicated via a firewall external to a data center between one or more internal endpoints internal to the data center and an external endpoint that is external to the data center, wherein each of the one or more flows comprises respective sequences of packets that share a certain set of attributes;

detecting that the flow data indicates that the one or more flows meet one or more good flow criteria, wherein the one or more good flow criteria comprise one or more of:

no resets or retransmits occurring for the one or more flows; or a termination packet being sent to terminate the one or more flows;

determining, based on the flow data meeting one or more trusted endpoint criteria, the external endpoint is trusted, wherein the one or more trusted endpoint criteria comprises one or more of:

a threshold number of the one or more flows to the external endpoint meeting the one or more good flow criteria within a moving time window; or the one or more flows to the external endpoint lacking any flow that fails to meet the one or more good flow criteria for a threshold duration;

generating one or more policies that flows associated with the external endpoint can bypass the firewall; and configuring the edge services gateway with the one or more policies to cause the edge services gateway to facilitate subsequent flows with the external endpoint while bypassing the firewall.

16. The non-transitory computer-readable medium of claim 15, wherein receiving the flow data comprises receiving one or more portions of the flow data from a plurality of edge services gateways, and further comprising configuring the plurality of edge services gateways with one or more rules.

17. The non-transitory computer-readable medium of claim 15, wherein the data center is a software-defined data center (SDDC) comprising a plurality of hosts, each of the plurality of hosts comprising a virtualization layer that abstracts physical resources for one or more virtual computing instances (VCI) supported by the virtualization layer.

18. The non-transitory computer-readable medium of claim 15, wherein the one or more trusted endpoint criteria further comprises:

the one or more flows meeting the one or more good flow criteria having lasted for a threshold duration.

19. The non-transitory computer-readable medium of claim 15, the operations further comprising identifying that each of the one or more flows is associated with the external endpoint based on packets of the one or more flows including in a header a destination IP address, destination port, and application associated with the endpoint.

20. The non-transitory computer-readable medium of claim 15, the operations further comprising expiring the one or more policies at the edge services gateway after a time period to cause the edge services gateway to communicate with the external endpoint via the firewall.

* * * * *